US007827232B2

(12) United States Patent
Bear et al.

(10) Patent No.: US 7,827,232 B2
(45) Date of Patent: Nov. 2, 2010

(54) RECORD BUTTON ON A COMPUTER SYSTEM

(75) Inventors: Eric Gould Bear, Bellevue, WA (US); Chad Magendanz, Issaquah, WA (US); Aditha May Adams, Seattle, WA (US); Carl Ledbetter, Mercer Island, WA (US); Steve Kaneko, Medina, WA (US); Dale Clark Crosier, Kirkland, WA (US); Scott Plank, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 2292 days.

(21) Appl. No.: 10/429,904

(22) Filed: May 5, 2003

(65) Prior Publication Data

US 2004/0225502 A1 Nov. 11, 2004

(51) Int. Cl.
*G06F 15/16* (2006.01)
(52) U.S. Cl. .................. 709/203; 704/201; 704/275; 360/60; 360/32; 369/83
(58) Field of Classification Search ............... 704/201, 704/275; 360/60, 32; 369/83; 709/203
See application file for complete search history.

(56) References Cited

U.S. PATENT DOCUMENTS

| | | | |
|---|---|---|---|
| 4,860,342 A | 8/1989 | Danner | 379/96 |
| 5,159,445 A | 10/1992 | Gitlin | |
| 5,388,268 A | 2/1995 | Beach | |
| 5,412,417 A | 5/1995 | Tozuka | |
| 5,487,181 A | 1/1996 | Dailey | |
| 5,491,800 A | 2/1996 | Goldsmith | |
| 5,519,772 A | 5/1996 | Akman | |
| 5,533,115 A | 7/1996 | Hollenbach et al. | |
| 5,546,538 A | 8/1996 | Cobbley | |
| 5,568,540 A | 10/1996 | Grecko | 379/88.25 |
| 5,657,414 A | 8/1997 | Lett | |
| 5,675,374 A | 10/1997 | Kohda | 348/14.1 |
| 5,675,810 A | 10/1997 | Sellers | |
| 5,732,216 A * | 3/1998 | Logan et al. | 709/203 |
| 5,745,761 A | 4/1998 | Celi | |
| 5,764,901 A | 6/1998 | Skarbo | |

(Continued)

FOREIGN PATENT DOCUMENTS

EP          0772327 A2    5/1997

(Continued)

OTHER PUBLICATIONS

Office Action dated Nov. 30, 2009 cited in U.S. Appl. No. 11/112,456.

(Continued)

*Primary Examiner*—Vijay B Chawan
(74) *Attorney, Agent, or Firm*—Workman Nydegger (57) ABSTRACT

A record button that facilitates audiovisual input into a computer system without requiring manual interaction (direct manipulation interaction) with software. The record button may be grouped with transport controls, a standalone button, or grouped with other controls. The record button may be actuated with different types of actuation techniques, each of which may correspond to a different audio and/or video operating mode, which may be user configurable. A record light may be provided to notify the user of the current recording mode via variable colors and/or flash patterns. The record button can work in conjunction with a camera button and with manual software switching of recording modes.

39 Claims, 8 Drawing Sheets

U.S. PATENT DOCUMENTS

| | | | |
|---|---|---|---|
| 5,768,164 A | 6/1998 | Hollon | |
| 5,802,305 A | 9/1998 | McKaughan | |
| 5,831,606 A | 11/1998 | Nakajima | |
| 5,907,604 A | 5/1999 | Hsu | |
| 5,959,622 A | 9/1999 | Greer | |
| 5,978,837 A | 11/1999 | Foladare | |
| 5,987,106 A | 11/1999 | Kitamura | |
| 5,991,822 A | 11/1999 | Mealy | |
| 5,991,836 A | 11/1999 | Renda | |
| 5,999,613 A | 12/1999 | Nabkel | |
| 6,006,285 A | 12/1999 | Jacobs | |
| 6,008,806 A | 12/1999 | Nakajima | |
| 6,052,442 A | 4/2000 | Cooper et al. | 379/88.19 |
| 6,101,610 A | 8/2000 | Beebe | |
| 6,118,856 A | 9/2000 | Paarsmark | |
| 6,144,363 A | 11/2000 | Alloul | 345/618 |
| 6,144,644 A | 11/2000 | Bajzath et al. | 370/259 |
| 6,160,550 A | 12/2000 | Nakajima | |
| 6,172,703 B1 | 1/2001 | Lee | 348/14.08 |
| 6,208,373 B1 | 3/2001 | Fong et al. | 348/14.16 |
| 6,215,420 B1 | 4/2001 | Harrison et al. | 341/22 |
| 6,237,846 B1 | 5/2001 | Lowell | |
| 6,240,168 B1 | 5/2001 | Stanford et al. | 379/110.01 |
| 6,266,714 B1 | 7/2001 | Jacobs | |
| 6,279,056 B1 | 8/2001 | Jacobs | |
| 6,282,435 B1 | 8/2001 | Wagner et al. | 455/566 |
| 6,346,934 B1 | 2/2002 | Wugofski | 345/158 |
| 6,362,440 B1 | 3/2002 | Karidis | |
| 6,380,968 B1 | 4/2002 | Alexander | |
| 6,390,371 B1 | 5/2002 | Armga | |
| 6,417,849 B2 | 7/2002 | Lefebvre | |
| 6,438,216 B1 | 8/2002 | Aktas | |
| 6,438,585 B2 | 8/2002 | Mousseau | |
| 6,453,027 B1 | 9/2002 | Kang | |
| 6,483,905 B1 | 11/2002 | Kikinis | 379/93.24 |
| 6,484,019 B1 | 11/2002 | Aklian | |
| 6,496,860 B2 | 12/2002 | Ludtke | |
| 6,507,356 B1 | 1/2003 | Jackel et al. | 348/14.06 |
| 6,513,128 B1 | 1/2003 | Wang | |
| 6,516,356 B1 | 2/2003 | Belknap et al. | |
| 6,518,957 B1 | 2/2003 | Lehtinen | 345/173 |
| 6,519,335 B1 | 2/2003 | Bushnell | |
| 6,546,262 B1 | 4/2003 | Freadman | |
| 6,603,855 B1 | 8/2003 | Cannon et al. | 379/377 |
| 6,628,194 B1 | 9/2003 | Hellebust | 340/7.5 |
| 6,628,267 B2 | 9/2003 | Karidis | |
| 6,658,095 B1 | 12/2003 | Yoakum | |
| 6,671,356 B2 | 12/2003 | Lewis | 379/88.13 |
| 6,671,743 B1 | 12/2003 | Verity | 709/321 |
| 6,674,457 B1 | 1/2004 | Davies | |
| 6,680,845 B2 | 1/2004 | Agata | |
| 6,690,778 B2 | 2/2004 | Kahn | |
| 6,691,233 B1 | 2/2004 | Gannage | |
| 6,718,183 B1 | 4/2004 | Blust | |
| 6,731,316 B2 | 5/2004 | Herigstad et al. | 715/864 |
| 6,732,365 B2 | 5/2004 | Belknap | |
| 6,741,232 B1 | 5/2004 | Siedlikowski | 345/156 |
| 6,757,372 B1 | 6/2004 | Dunlap et al. | 379/142 |
| 6,806,867 B1 | 10/2004 | Arruda | |
| 6,816,881 B1 | 11/2004 | Mohindra | |
| 6,819,961 B2 | 11/2004 | Jacobs | |
| 6,831,657 B2 | 12/2004 | Tsutsumi et al. | 345/589 |
| 6,882,326 B2 | 4/2005 | Hirayama | 345/1.1 |
| 6,888,562 B2 | 5/2005 | Rambo et al. | 348/14.16 |
| 6,892,074 B2 | 5/2005 | Tarkiainen | 455/466 |
| 6,897,851 B2 | 5/2005 | Carini | |
| 6,902,332 B2 | 6/2005 | McLoone | 400/472 |
| 6,912,283 B2 | 6/2005 | Meyerson et al. | 379/428.04 |
| 6,918,123 B1 | 7/2005 | Shteyn | |
| 6,937,950 B2 | 8/2005 | Cragun | |
| 6,938,174 B2 | 8/2005 | LeKuch | |
| 6,970,556 B2 | 11/2005 | Wall et al. | 379/355.01 |
| 6,973,167 B2 | 12/2005 | Kikinis | 379/67.1 |
| 6,976,216 B1 | 12/2005 | Peskin et al. | 715/716 |
| 6,980,641 B1 | 12/2005 | Stanford et al. | 379/387 |
| 6,996,445 B1 | 2/2006 | Kamijo | 700/94 |
| 7,000,237 B1 | 2/2006 | Sinha | |
| 7,036,110 B2 | 4/2006 | Jeyaraman | |
| 7,068,641 B1 | 6/2006 | Allan | |
| 7,085,814 B1 | 8/2006 | Gandhi | |
| 7,096,391 B2 | 8/2006 | Johnson | |
| 7,106,472 B2 | 9/2006 | Gomez | |
| 7,123,370 B2 | 10/2006 | Watanabe | |
| 7,221,331 B2 | 5/2007 | Bear | |
| 7,227,511 B2 | 6/2007 | Adan | |
| 7,231,229 B1 | 6/2007 | Hawkins | |
| 7,243,130 B2 | 7/2007 | Horvitz | |
| 7,272,660 B1 | 9/2007 | Powers | |
| 7,292,588 B2 | 11/2007 | Milley | |
| 7,302,637 B1 | 11/2007 | Maguire | |
| 7,376,932 B2 | 5/2008 | Chen | |
| 7,401,053 B2 | 7/2008 | Kamimura | |
| 7,519,911 B2 | 4/2009 | Friedman | |
| 2001/0034251 A1 | 10/2001 | Goto | |
| 2001/0040551 A1 | 11/2001 | Yates et al. | 345/156 |
| 2002/0004855 A1 | 1/2002 | Cox | |
| 2002/0015020 A1 | 2/2002 | Mobin | 345/156 |
| 2002/0019812 A1 | 2/2002 | Board | |
| 2002/0080967 A1 | 6/2002 | Abdo | |
| 2002/0087225 A1 | 7/2002 | Howard | |
| 2002/0099456 A1 | 7/2002 | McLean | |
| 2002/0114430 A1 | 8/2002 | Murata | |
| 2002/0131072 A1 | 9/2002 | Jackson | |
| 2002/0144191 A1 | 10/2002 | Lin | |
| 2002/0167458 A1 | 11/2002 | Baudisch | |
| 2002/0167460 A1 | 11/2002 | Baudisch | |
| 2003/0021290 A1 | 1/2003 | Jones | 370/466 |
| 2003/0025674 A1 | 2/2003 | Watanabe | |
| 2003/0037180 A1 | 2/2003 | Madineni et al. | 709/321 |
| 2003/0046448 A1 | 3/2003 | Fischer | |
| 2003/0069689 A1 | 4/2003 | Ihara | |
| 2003/0074590 A1 | 4/2003 | Fogle | |
| 2003/0112325 A1 | 6/2003 | Boyden et al. | 348/14.16 |
| 2003/0118003 A1 | 6/2003 | Geck | |
| 2003/0122874 A1 | 7/2003 | Dieberger | |
| 2003/0131148 A1 | 7/2003 | Kelley et al. | 717/101 |
| 2003/0146903 A1 | 8/2003 | Yi | |
| 2003/0188041 A1 | 10/2003 | Fillmore | |
| 2003/0197685 A1 | 10/2003 | Yi | |
| 2003/0227471 A1 | 12/2003 | Eglit | |
| 2004/0001087 A1 | 1/2004 | Warmus | |
| 2004/0027375 A1 | 2/2004 | Ellis | |
| 2004/0052341 A1 | 3/2004 | Yeh | |
| 2004/0103144 A1 | 5/2004 | Sallam | |
| 2004/0110490 A1 | 6/2004 | Steele | |
| 2004/0114032 A1 | 6/2004 | Kakii | 348/14.08 |
| 2004/0135819 A1 | 7/2004 | Maa | |
| 2004/0141012 A1 | 7/2004 | Tootill | 345/827 |
| 2004/0155956 A1 | 8/2004 | Libbey | 348/14.16 |
| 2004/0177361 A1 | 9/2004 | Bernhard et al. | 719/321 |
| 2004/0210628 A1 | 10/2004 | Inkinen | |
| 2004/0222977 A1 | 11/2004 | Bear | 340/815.4 |
| 2004/0222978 A1 | 11/2004 | Bear | 345/172 |
| 2004/0223058 A1 | 11/2004 | Richter | |
| 2004/0223061 A1 | 11/2004 | Bear | 348/207.1 |
| 2004/0223599 A1 | 11/2004 | Bear | 379/215.01 |
| 2004/0225502 A1 | 11/2004 | Bear | 704/270 |
| 2004/0225892 A1 | 11/2004 | Bear | 726/2 |
| 2004/0225901 A1 | 11/2004 | Bear | 713/300 |
| 2004/0240167 A1 | 12/2004 | Ledbetter et al. | 361/683 |
| 2004/0240650 A1 | 12/2004 | Bear | 455/426.1 |
| 2004/0266426 A1 | 12/2004 | Marsh | |
| 2005/0005067 A1 | 1/2005 | Cutler | |
| 2005/0068423 A1 | 3/2005 | Bear | 345/156 |

| | | |
|---|---|---|
| 2005/0069101 A1 | 3/2005 | Bear .................... 379/90.01 |
| 2005/0071437 A1 | 3/2005 | Bear ........................ 713/1 |
| 2005/0071626 A1 | 3/2005 | Bear ........................ 713/1 |
| 2005/0182822 A1 | 8/2005 | Daniel |
| 2005/0186942 A1 | 8/2005 | Griffin |
| 2005/0193396 A1 | 9/2005 | Stafford-Fraser |
| 2005/0259032 A1 | 11/2005 | Morris |
| 2005/0262302 A1 | 11/2005 | Fuller |
| 2006/0007051 A1 | 1/2006 | Bear ......................... 345/1.1 |
| 2006/0048062 A1 | 3/2006 | Adamson |
| 2006/0061516 A1 | 3/2006 | Campbell |
| 2006/0095525 A1 | 5/2006 | Mousseau |
| 2006/0100978 A1 | 5/2006 | Heller |
| 2006/0130072 A1 | 6/2006 | Rhote |
| 2006/0130075 A1 | 6/2006 | Rhoten ..................... 719/328 |
| 2006/0164324 A1 | 7/2006 | Polivy ...................... 709/206 |
| 2006/0168355 A1 | 7/2006 | Shenfield et al. |
| 2006/0236221 A1 | 10/2006 | McCausland |
| 2006/0242590 A1 | 10/2006 | Polivy |
| 2006/0284787 A1 | 12/2006 | Bear |
| 2009/0259327 A1 | 10/2009 | Bear |
| 2009/0305695 A1 | 12/2009 | Bear |
| 2010/0008488 A1 | 1/2010 | Bear |
| 2010/0010653 A1 | 1/2010 | Bear |
| 2010/0054432 A1 | 3/2010 | Brahm |

FOREIGN PATENT DOCUMENTS

| | | |
|---|---|---|
| EP | 0777394 A1 | 6/1997 |
| EP | 000816990 | 1/1998 |
| EP | 0838934 A1 | 4/1998 |
| EP | 0772327 A3 | 2/1999 |
| WO | WO9602049 A1 | 1/1996 |
| WO | WO/01/69387 | 9/2001 |
| WO | 03/085960 | 10/2003 |

OTHER PUBLICATIONS

Office Action dated Dec. 24, 2009 cited in U.S Appl. No. 11/509,431.
Office Action dated Feb. 22, 2010 cited in U.S. Appl. No. 11/509,431.
Office Action dated Nov. 28, 2008 cited in U.S. Appl. No. 10/677,118.
Office Action dated Jan. 2, 2009 cited in U.S. Appl. No. 11/837,302.
Notice of Allowance dated Feb. 6, 2009 cited in U.S. Appl. No. 10/429,943.
Office Action dated Feb. 20, 2009 cited in U.S. Appl. No. 11/053,186.
Office Action dated Feb. 19, 2009 cited in U.S. Appl. No. 10/996,558.
U.S. Appl. No. 11/509,437, filed Aug. 23, 2006, Bear.
U.S. Appl. No. 11/559,821, filed Nov. 14, 2006, Bear.
U.S. Appl. No. 11/685,014, filed Mar. 12, 2007, Bear.
Anonymous, International Search Report in Corresponding EP Application No. EP 04 00 9868.
U.S. Appl. No. 11/837,302, filed Aug. 10, 2007, Bear.
Oxford On-line Dictionary, http://dictionary.oed.com/entrance.dtl, Oxford University Press 2007, on the definition of the world "physical" under III/7b.
Office Action dated Aug. 8, 2007 cited in related U.S. Appl. No. 10/996,371.
Office Action dated Jul. 31, 2007 cited in related U.S. Appl No 10/677,084.
Office Action dated Jul. 27, 2007 cited in related U.S. Appl. No. 10/996,557.
Office Action dated Jul. 30, 2007 cited in related U.S. Appl. No. 10/430,369.
Office Action dated Jul. 6, 2007 cited in related U.S. Appl. No. 10/429,943.
Notice of Allowance dated Sep. 7, 2007 cited in related U.S. Appl. No. 10/429,931.
Office Action dated Sep. 24, 2007 cited in related U.S. Appl. No. 10/429,933.
Office Action dated Feb. 15, 2008 cited in related U.S Appl. No. 10/429,933.
Notice of Allowance dated Jan. 30, 2008 cited in related U.S. Appl. No. 10/429,931.
Office Action dated Mar. 21, 2008 cited in related U.S. Appl. No. 10/966,557.
Office Action dated Feb. 28, 2008 cited in related U.S. Appl. No. 10/966,371.
Office Action dated Sep. 28, 2007 cited in related U.S. Appl. No. 10/429,943.
Office Action dated Mar. 26, 2008 cited in related U.S. Appl. No. 10/428,943.
Office Action dated Mar. 18, 2008 cited in related U.S. Appl. No. 10/677,118.
Office Action dated Oct. 15, 2007 cited in related U.S. Appl. No. 10/429,903.
Notice of Allowance dated Apr. 2, 2008 cited in related U.S. Appl. No. 10/429,903.
Noice of Allowance dated Apr. 23, 2008 cited in related U.S. Appl. No. 10/430,369.
Office Action dated Jan. 11, 2008 cited in related U.S. Appl. No. 10/677,084.
Notice of Allowance dated Apr. 29, 2008 cited in related U.S. Appl. No. 10/677,084.
Office Action dated May 15, 2008 cited in related U.S. Appl. No. 11/837,302.
Office Action dated Aug. 6, 2008 cited in U.S. Appl. No. 10/429,943.
Office Action dated Aug. 20, 2006 cited in U.S. Appl. No. 10/429,933.
Office Action dated Feb. 14, 2007 cited in U.S. Appl. No. 10/429,905.
Office Action dated May 21, 2007 cited in U.S. Appl. No. 10/429,905.
Office Action dated Apr. 4, 2006 cited in U.S. Appl. No. 10/429,930.
Office Action dated Jul. 14, 2006 cited in U.S. Appl. No. 10/429,930.
Office Action dated Nov. 14, 2006 cited in U.S. Appl. No. 10/429,930.
Notice of Allowance dated Mar. 16, 2007 cited in U.S. Appl. No. 10/429,930.
Office Action dated Aug. 9, 2005 cited in U.S. Appl. No. 10/429,932.
Office Action dated Oct. 4, 2005 cited in U.S. Appl. No. 10/429,932.
Office Action dated Mar. 17, 2006 cited in U.S. Appl. No. 10/429,932.
Office Action dated Aug. 15, 2006 cited in U.S. Appl. No. 10/429,932.
Notice of Allowance dated Jan. 25, 2007 cited in U.S. Appl. No. 10/429,932.
Office Action dated Mar. 16, 2006 cited in U.S. Appl. No. 10/677,101.
Office Action dated Sep. 6, 2006 cited in U.S. Appl. No. 10/677,101.
Notice of Allowance dated Feb. 2, 2006 cited in U.S. Appl. No. 10/677,101.
Office Action dated Mar. 26, 2007 cited in U.S. Appl. No. 10/429,931.
Office Action dated Sep. 26, 2006 cited in U.S. Appl. No. 10/430,369.
Office Action dated Mar. 20, 2007 cited in U.S. Appl. No. 10/430,369.
Office Action dated Jan. 3, 2007 cited in U.S. Appl. No. 10/429,903.
Office Action dated Feb. 6, 2007 cited in U.S. Appl. No. 10/429,943.
Office Action dated Jul. 6, 2007 cited in U.S. Appl. No. 10/429,943.
Office Action dated Mar. 6, 2007 cited in U.S. Appl. No. 10/429,933.
Office Action dated Aug. 20, 2005 cited in U.S. Appl. No. 10/677,084.
Officr Action dated Jan. 19, 2006 cited in U.S. Appl. No. 10/677,084.
Office Action dated Nov. 1, 2006 cited in U.S. Appl. No. 10/677,084.
Notice of Allowance dated Mar. 19, 2099 cited in U.S. Appl. No. 10/677,118.
Notice of Allowance dated Mar. 24, 2009 cited in U.S. Appl. No. 11/837,302.
Office Action dated Apr. 3, 2009 cited in U.S. Appl. No. 11/685,014.
Office Action dated Nov. 5, 2008 cited in U.S. Appl. No. 10/996,634.
Notice of Allowance dated Mar. 30, 2009 cited in U.S. Appl. No. 10/996,634.
Notice of Allowance dated Apr. 6, 2009 cited in U.S. Appl. No. 10/429,943.
Office Action dated Apr. 15, 2009 cited in U.S. Appl. No. 11/509,437.
Notice of Allowance dated Apr. 16, 2009 cited in U.S. Appl. No. 10/996,371.
Office Action dated Apr. 24, 2009 cited in U.S. Appl. No. 11/509,431.

Office Action dated May 12, 2009 cited in U.S. Appl. No. 11/112,456.
Notice of Allowance dated Jul. 21, 2009 cited in U.S. Appl. No. 11/685,014.
Notice of Allowance dated Aug. 27, 2009 cited in U.S. Appl. No. 10/996,558.
Office Action dated Sep. 2, 2009 cited in U.S. Appl. No. 11/053,186.
Office Action dated Sep. 15, 2009 cited in U.S. Appl. No. 11/509,437.
Office Action dated Sep. 25, 2009 cited in U.S. Appl. No. 11/509,431.
Notice of Allowance dated Oct. 5, 2009 cited in U.S. Appl. No. 10/996,557.
Office Action dated Oct. 15, 2008 cited in U.S. Appl. No. 11/509,437.
Office Action dated Oct. 20, 2008 cited in U.S. Appl. No. 11/509,431.
Office Action dated Nov. 6, 2008 cited in U.S. Appl. No. 10/996,557.
Office Action dated Oct. 1, 2008 cited in U.S. Appl. No. 10/996,371.
Anonymous, International Search Report in Corresponding EP Application No. EP 04 00 9868.
Office Action dated Apr. 29, 2010 cited in U.S. Appl. No. 12/542,506.
U.S. Appl. No. 11/053,186, May 13, 2010, Notice of Allowance.

* cited by examiner

RECORD BUTTON ON A COMPUTER SYSTEM

CROSS-REFERENCE TO RELATED APPLICATIONS

The present invention is related to the following copending U.S. patent applications filed concurrently herewith, assigned to the assignee of the present invention, and hereby incorporated by reference in their entireties:

"Method and System for Auxiliary Display of Information for a Computing Device," U.S. patent application Ser. No. 10/429,932;

"Real-Time Communications Architecture and Methods for use with a Personal Computer System," U.S. patent application Ser. No. 10/429,905;

"Method and System for Auxiliary Processing Of Information for a Computing Device," U.S. patent application Ser. No. 10/429,930;

"System and Method for Activating a Computer System;" U.S. patent application Ser. No. 10/429,903;

"Computer System with Do Not Disturb System and Method," U.S. patent application Ser. No. 10/430,369;

"Computer Camera System and Method for Reducing Parallax," U.S. patent application Ser. No. 10/429,943;

"Control and Communications Panel for a Computer System," U.S. patent application Ser. No. 10/439,933; and "Notification Lights, Locations and Rules for a Computer System," U.S. patent application Ser. No. 10/439,931.

FIELD OF THE INVENTION

The invention relates generally to audio controls and computer systems.

BACKGROUND OF THE INVENTION

Personal computers have evolved over time to accept various kinds of input. Contemporary computing devices allow audio input via a microphone. Such audio input is supported by contemporary operating systems, such as Microsoft Windows®-based operating systems, which provide a sound recorder to record, mix, play, and edit sounds, and also to link sounds to a document, or insert sounds into a document. Application programs and integrated programs such as Microsoft® Office$^{xp}$ offer speech recognition, which converts speech to text.

While audio input to a computer system is thus supported by software, a certain level of skill and effort is required to use these audio features to any reasonable extent. For example, to insert an audio comment (voice comment or voice annotation) into a word processing document such as via the Microsoft® Word word processing program, the user needs to know to put up a reviewing toolbar, click an arrow next to a new comment icon, click a voice comment icon, and click a record button on a sound object dialog and speak to record the voice comment. When finished recording, the user needs to click a stop button, and then exit the dialog to resume typing. Other programs have like requirements for entering a voice comment. Even a skilled user still has to perform a fair amount of work and manipulate the pointing device a significant amount to enter such comments.

Other uses for audio input include speech recognition to enter text, and command and control, in which a user speaks commands to the computer system to perform operations. These tasks also require a fair amount of familiarity with the audio programs and a fair amount skill and effort to perform.

Video input via a camera is also becoming popular. In general, video input suffers from the same drawbacks as audio input, which is that it is difficult in use.

What is needed is a way for users to efficiently and intuitively leverage the audio and video capabilities provided with contemporary computer systems, operating systems and applications. The method and system should be simple and fast for users to learn and operate, and configurable to some extent to meet various user scenarios and usage patterns.

SUMMARY OF THE INVENTION

Briefly, the present invention provides a record button (human interface device) that facilitates audiovisual input without requiring manual interaction (direct manipulation interaction) with software. Simple actuation of the record button is all that may be required for a user to enter audio or video into the system, or record other types of information, as the record button connects with (operably couples to) the operating system to provide the information needed for the user's given operating context. For example, when working with a document, a single press of the record button may insert an audio annotation into the document at an appropriate location, such as at the cursor location in a word processing document, a selected cell of a spreadsheet, and so on. When listening to a voicemail message recorded in the computer, a press of the record button will allow the user to record an audio reply to that message, e.g., for sending to the party that left the message.

The record button may be configured to respond to different methods of actuation, each of which may correspond to a different audio operating mode. For example, a single-pressed-and-release actuation may be handled as a straight audio recording operation that passes audio into a top-level window, a hold-and-release (hold for some threshold amount of time but release before too long) actuation may be handled as a speech-to-text conversion prior to sending the text to the top-level window, while a hold-indefinitely actuation may be handled as a command and control function, e.g., recognize the command and pass it to the operating system. A double-press mode can send voice recognized commands to the top-level window. Video may be entered as well, such as when the audio mode is selected to provide an audio stream to a program, the application context will accept video, and the camera shutter position is open.

The various types of actuation methods and the time limits may be configurable by the user beyond default values, and the operating modes that result may be mapped to the actuation methods, as well as individually selected or deactivated.

A record light may be provided to notify the user of the current action, corresponding to the current recording mode. Colors and/or flash patterns may be varied to provide the information. For example, off may indicate not selected, red may indicate recording straight audio and/or video, yellow when speech to text recognition is active, and green when command and control is active. Flash patterns may also be provided, such as to indicate noisy conditions, or provide similar warnings and other information. Other colors and flash patterns, and alternative meanings, are feasible.

The record button can work with manual software switching as well, e.g., to change modes to an extent based on software commands rather than solely on a method of actuation. Thus, by software switching, a user can use as little as one record button actuation technique, such as a single press and release actuation, for different modes of operation.

Other advantages will become apparent from the following detailed description when taken in conjunction with the drawings, in which:

DETAILED DESCRIPTION

Exemplary Operating Environment

Figure 1:
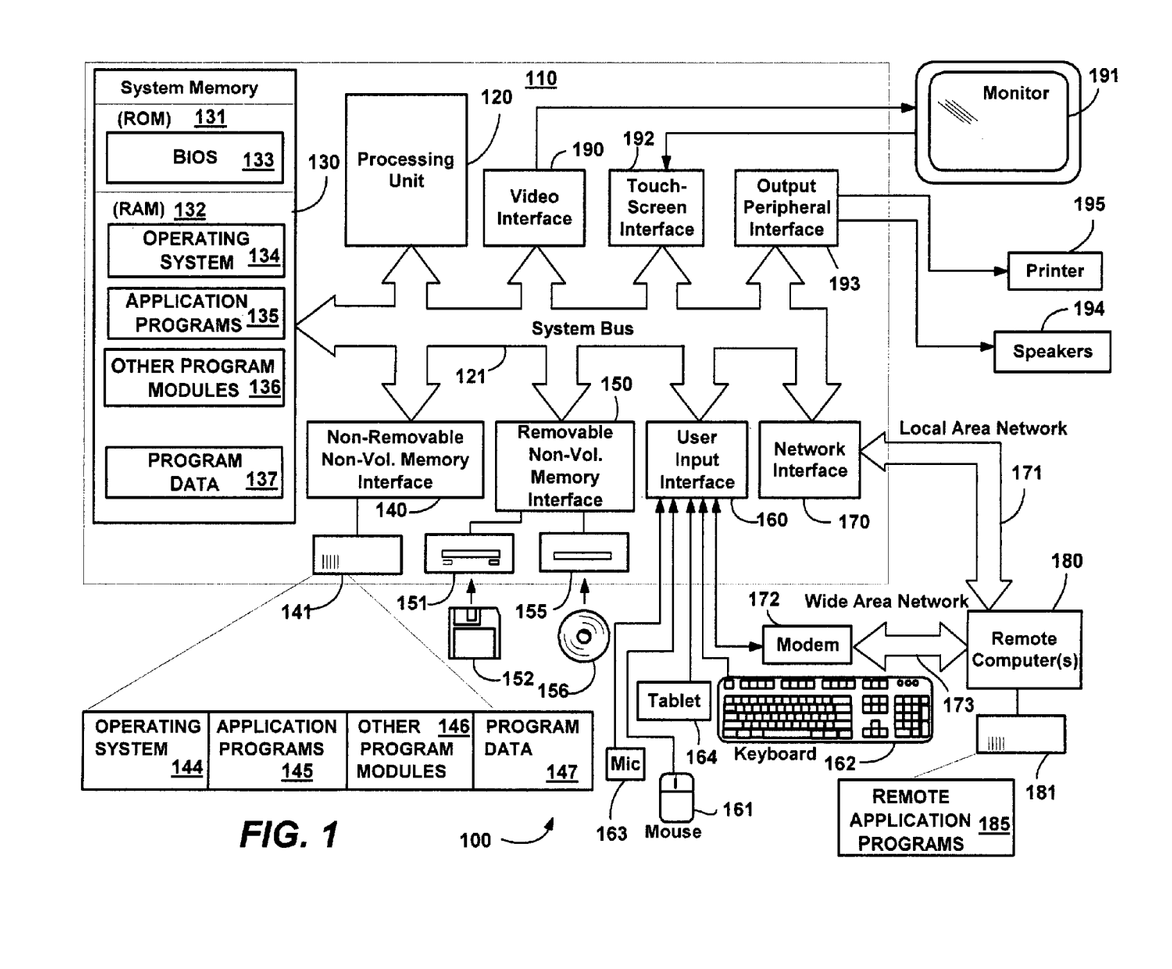
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Record Button

The present invention is generally directed towards a record button coupled to the computer system, which facilitates the inputting of audio and/or video input (referred to herein as audiovisual input generally, even if only audio or only video one is being input) into a computer system. As will be understood, one or more record buttons may be built into a computer system (such as on the keyboard, mouse or monitor) or external and coupled to the computer system, such as within an add-on set of control buttons or on an external microphone. Indeed, one of the mouse buttons may be assigned to act as the record button. Moreover, it will be readily apparent that the various examples herein, such as with respect to operating modes, actuation methods, indicator displays and so on are non-limiting examples, and that the present invention may be implemented in numerous ways. For example, as will be understood, although the present invention primarily uses examples herein of using the record button with a microphone and/or camera, the record button may be used for recording of content or system states other than via microphone or camera, such as to or from a series of system events, physical user input, user interactions, data transmissions, computations, renderings, and broadcast or removable media. Thus, as used herein, the record button may be used with any data capable of being recorded.

Figure 2:
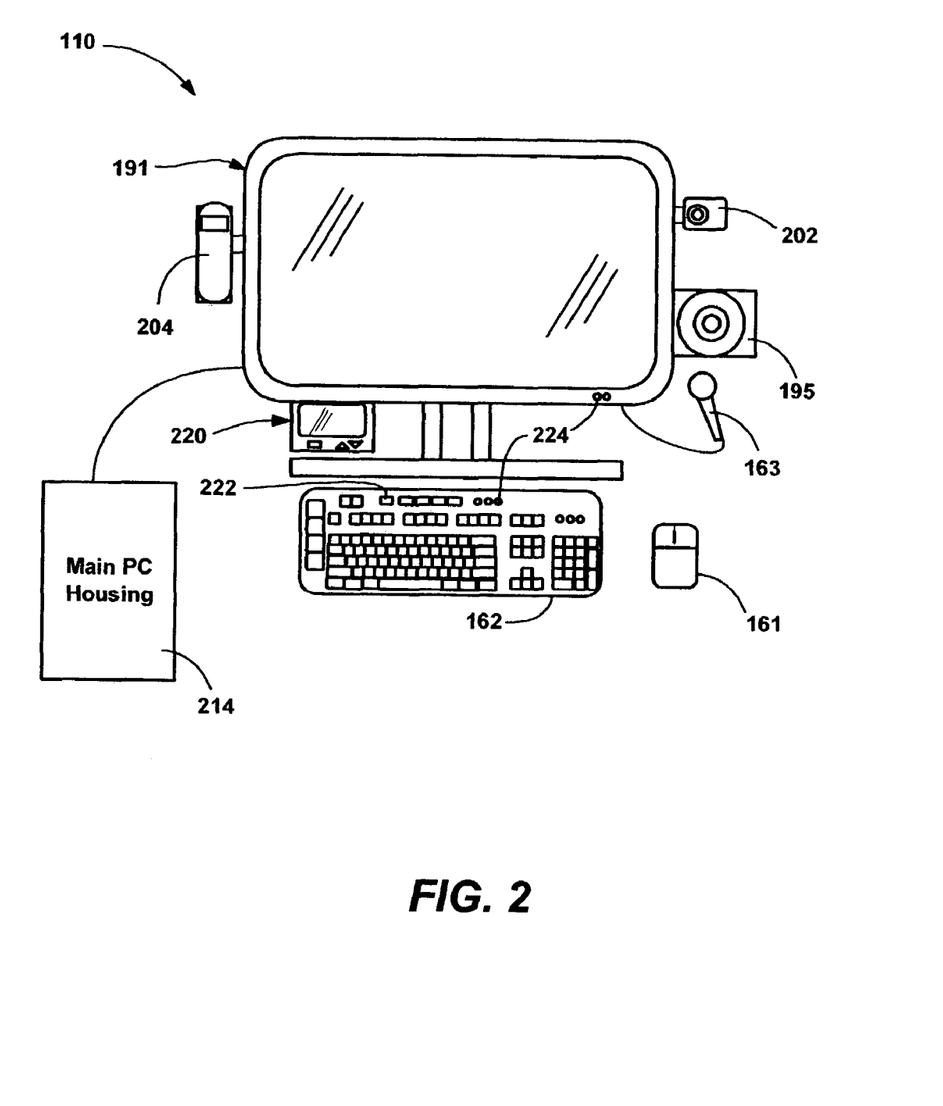
FIG. 2 is a general representation of a computer system arranged with a recording capabilities including a record button in accordance with an aspect of the present invention.

Turning to FIG. 2 of the drawings, there is shown a computer system, such as the computer system 110 of FIG. 1, in which various input and output mechanisms are integrated. For example, the computer system 110 includes a monitor 191 which may have an attached camera 202 for inputting video data, an attached telephone (e.g., handset) 204 which may serve as an audio input device, an attached speaker 195, and a microphone 163 which (more typically) serves as an audio input device. Other devices not separately represented in FIG. 2 include mobile communications devices such as a cellular telephone or other mobile computing device capable of connecting in some way (e.g., by wired cradle or Bluetooth™ technology) with the computer system. Such devices are also capable of serving as audio input devices. Any of the connections may be wired or wireless, whereby each of these devices may be considered part of a computer system, and if so, are connected directly or indirectly by a wired or wireless connection to interfaces at the main PC housing 214 (containing at least the processor and memory, but also typically containing some non-volatile storage).

Also represented in FIG. 2 is an auxiliary display device 220, such as for displaying various types of data, including audiovisual recording-related data, which may not necessarily appear on the main display. The auxiliary display 220 is preferably small (relative to the main display screen 191), and may be the display of another device, such as the screen of a mobile computing device, but may also be a dedicated display, such as one that is operably coupled to the computer operating system when the computer system 110 is in a powered-up state. Further, note that the auxiliary display need not be an actual display, but can be a projection (e.g., onto a wall) of the information. Note that the auxiliary display device 220 may provide or be connected to some of its own processing and storage resources, so as to remain functional to some extent when the computer operating system is not running. For example, using the auxiliary display device 220, the user may navigate through voice mail messages even when the computer system is in a powered-down mode, and respond to those messages with an audio message by using the record button, provided that the button also remains active.

In accordance with an aspect of the present invention, the computer system, such as on the keyboard 162 and/or monitor 191 (and/or possibly the pointing device 161) provides a record button, shown in FIG. 2 as the record button 222. Non-conventional indicators 224, such as at least one LED that is related to the state of recording, also may be provided. Note that as described below, the record LED (or one, if more than one record LED is present) is generally in close proximity to (or incorporated into) the record button 222.

Figure 3:
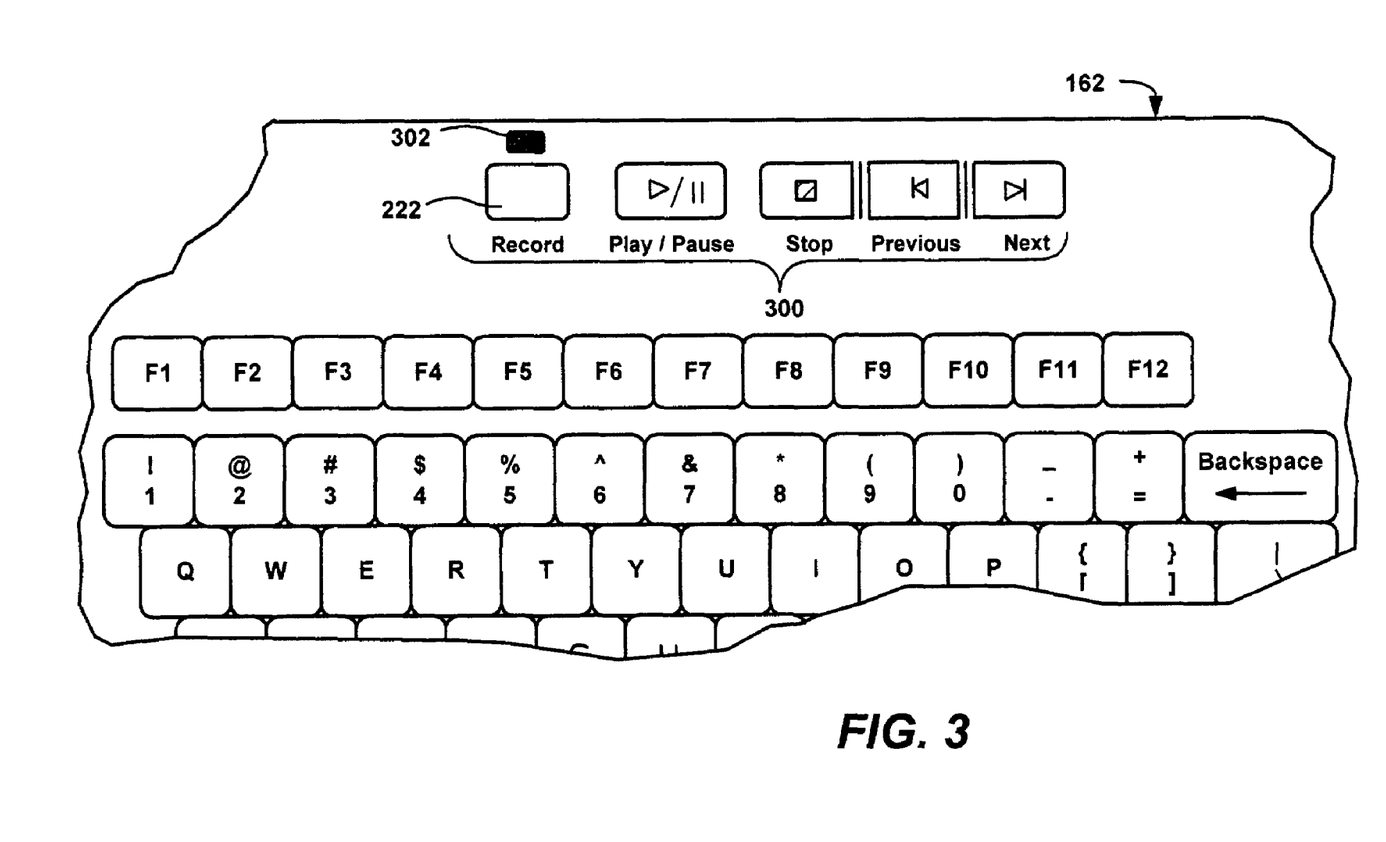
FIG. 3 is a general representation of a partial keyboard including a record button present among transport controls incorporated into the keyboard, in accordance with an aspect of the present invention.

As generally represented in FIG. 3, in one alternative implementation, the computer system 110 includes the record button 222 among keyboard-based transport controls 300 on the keyboard 162. As shown in FIG. 2, a record indicator 302 may comprise an external indicator, e.g., an LED above the record button 302 or located elsewhere, which means that it is advantageously visible when the record button 222 is pressed and held. In general, the record indicator 302 should be close to the record button 222, so that the user sees it when pressing the record button 222, but may be positioned (and/or duplicated in some appropriate location) so as to enhance its visibility.

Figure 4:
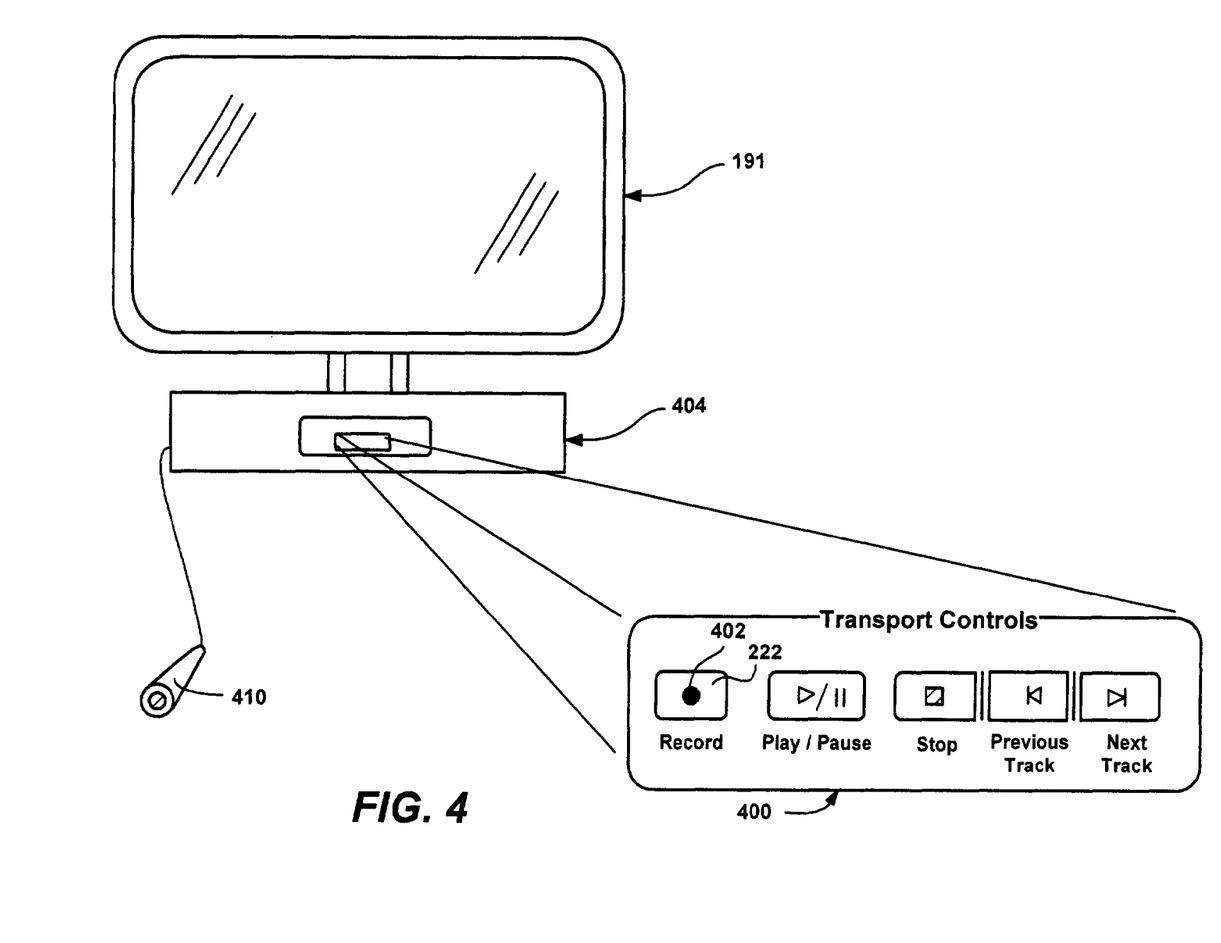
FIG. 4 is a representation of a control panel positioned beneath a computer monitor and having a record button present among transport controls incorporated into the control panel, in accordance with an aspect of the present invention.

FIG. 4 shows an alternative arrangement, with the record button 222 again provided among control panel-based transport controls 400, shown magnified in FIG. 4. In this alternative example, the record indicator 402 is shown as being incorporated into the record button 222, but as is understood that the record indicator 402 instead may be external to the record button as in FIG. 3. In FIG. 4, the control panel 404 is shown as being attached to or underneath the main display 191, which provides very good visibility of the record light 402, but it may not be as convenient for the user to press the record button 222 (as compared to pressing one on a keyboard as in FIG. 3). A wired or wireless record button 410 such as constructed to be held by a user, may also be provided.

Figure 5:
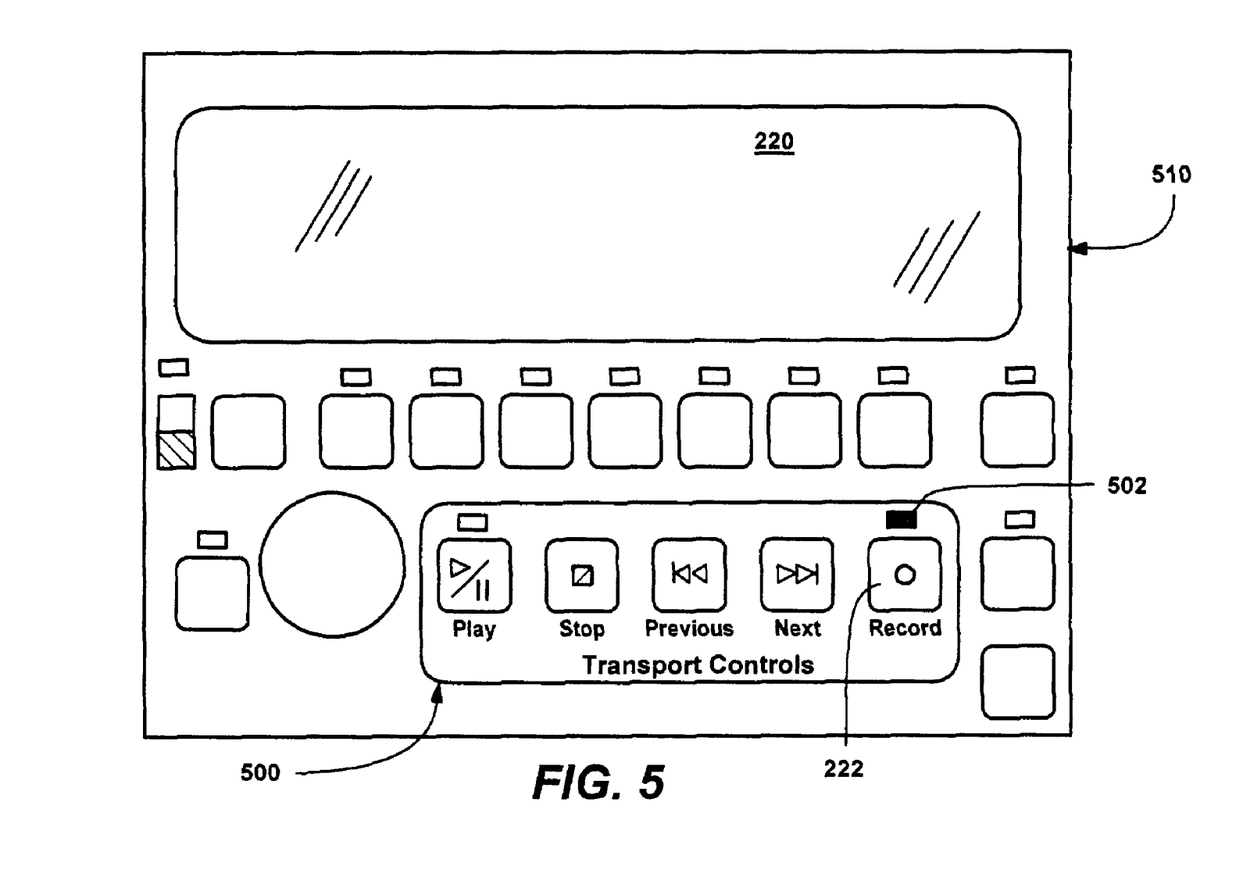
FIG. 5 is a representation of another control panel positioned for accessibility by a user and having a record button present among transport controls, in accordance with an aspect of the present invention.

FIG. 5 provides an alternative control panel 510 including an auxiliary display 220 and transport controls 500. In FIG. 5, the record button 222 is shown to the right of the other transport controls to exemplify the various locations a record button 222 may be positioned. Note that the record button 222 need not be grouped with other transport controls, but may be grouped with some other set of buttons, or may be an independent button. In fact, the record button may be placed on a microphone, headset, handset, and so forth, and/or may be an add-on to a computer system, such as by providing a button (such as the button 410 in FIG. 4) that connects to a USB or infrared port, or a as a Bluetooth™ device or other wired or wireless connection.

Figure 6:
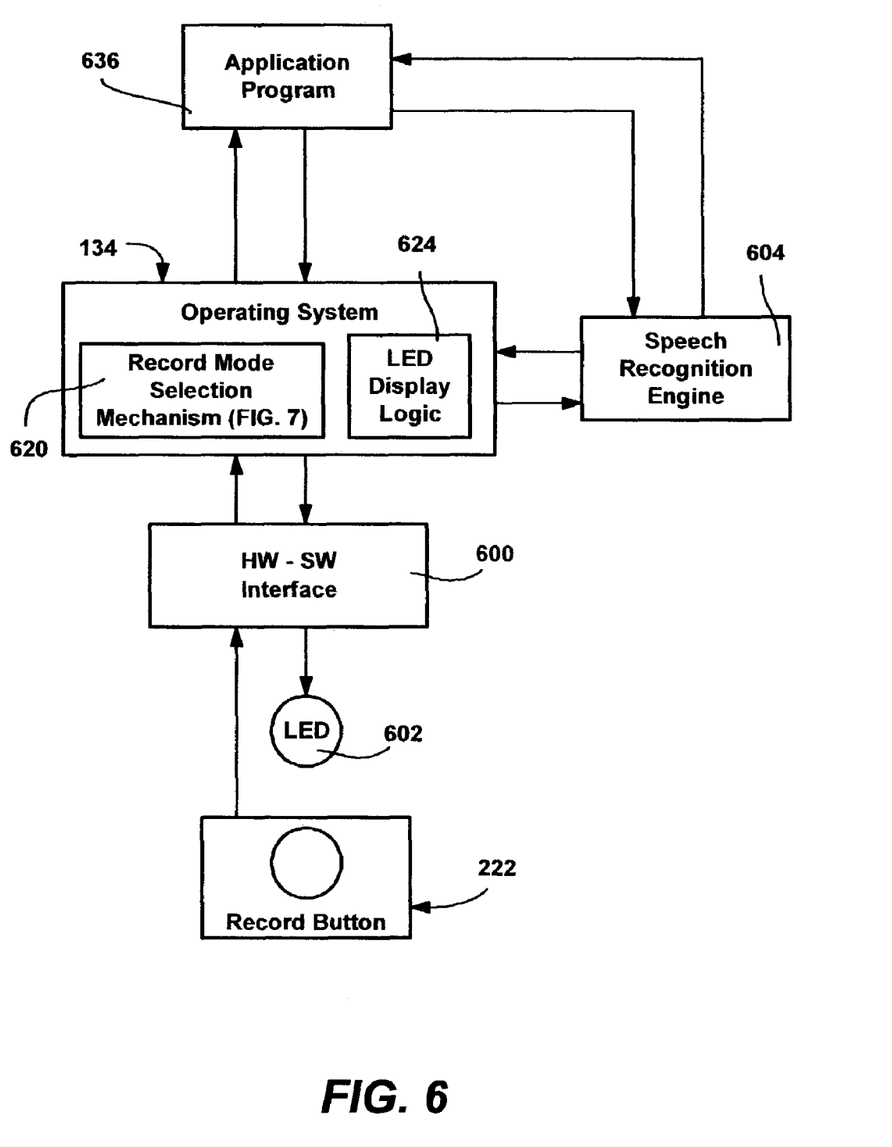
FIG. 6 is a block diagram generally representing a record button and record indicator interfacing with operating system components, in accordance with an aspect of the present invention.

Turning to an explanation of the use of the record button, as generally represented in FIG. 6, the record button 222 operably couples through an appropriate hardware/software interface 600 to signal state data to the operating system 134 (or some other software code such as an application program, driver and so forth, which is considered equivalent). The operating system 134 in turn may interpret what the state means via a record mode selection mechanism 610, such as to determine an action to take based on the button, e.g., to pass messages or otherwise communicate corresponding state data to an application program 636. For example, so that the application program will know to accept the audiovisual input in an appropriate manner based on its current context, the operating system 134 may place one or more appropriate messages in the application's window before providing the audiovisual data to the application.

By way of example, pressing the record button 222 while in an active application 636 that supports recording video or audio streams may cause the application 636 to display an audio/video monitor dialog, set the record indicator (LED 602), and begin capturing the stream to memory or disk. Again pressing the record button 222, or pressing a stop button (e.g., in the transport controls), stops the recording and automatically saves, or offer options for saving, the stream that was captured. Note that a pause button may be used to pause and resume the recording process.

Other operating modes are feasible. The application may be set to perform dictation, in which received audio is converted to text and text entered into a document. These varying operating modes may be set by manual interaction with the application program and/or operating system, but in keeping with the present invention, instead may be controlled by the record button. For example while momentary contact of the record button may toggle the record mode, the user can press and hold the record button to capture quick voice notes, or perform other functions. Various example actuation methods and example modes that result are described below with reference to FIG. 7. Note that the record button may be configured so as to require simultaneous actuation of the record button and a play button or the like in order to be considered a valid record actuation.

The operating system 134, or application program 636 via the operating system 134, may control the display of the indicator 602. In general, the record indicator 602 is lit as steady red when the foreground application is recording live audio or video streams, although this may be configurable, e.g., by color-blind individuals. Other colors and/or patterns may indicate additional information to users, as described below.

Depending on the mode of operation and the application program's current context, speech to text recognition may be active, as performed by a speech recognition engine 604 or the like. For example, the application may be incapable of handling speech, but the system set up so that the operating system sends the audio to a speech recognition engine 604 that converts the speech to text, which the operating system then sends to the application program. Applications that are speech-aware can receive audio and contact the speech recognition engine 604 on their own for conversion to text. Further, the speech recognition engine 604 can be employed in command-and-control scenarios, in which the operating system 134 or application receives audio commands, which are recognized and treated as commands instead of as text to enter.

Note that with speech recognizers, typically code words or phrases (e.g., "voice command" versus "dictation") are used to switch modes, or to distinguish commands from text, or icons are clicked for this purpose. The present invention enables the record button to change modes, and further, the current mode may indicate whether the command is directed to the application program or to the operating system without having to make this selection by mouse clicking or speaking (which can be misinterpreted).

By way of example, consider four modes of recording operation, namely a record mode that sends audiovisual data to an application (e.g., the top-level one), a dictation mode that uses speech recognition (whether by the application or the operating system to send text to the application), a command and control mode for issuing commands to the operating system, and a command and control mode for issuing commands to the application. The camera's settings in conjunction with the application's capabilities can determine whether video accompanies the audio.

A user can select from among these modes by actuating the record button 222 in different ways. For example, a user can press and release the button once, press-and-release it twice quickly (like a double-click), hold the button for a threshold time that indicates that this is more than a single or double press (e.g., greater than one-half of a second) and then release it, and hold the button indefinitely, which may trigger the mode at some other threshold time, (e.g., one second). Each of these may be mapped to one of the above-described recording/operating modes.

Figure 7:
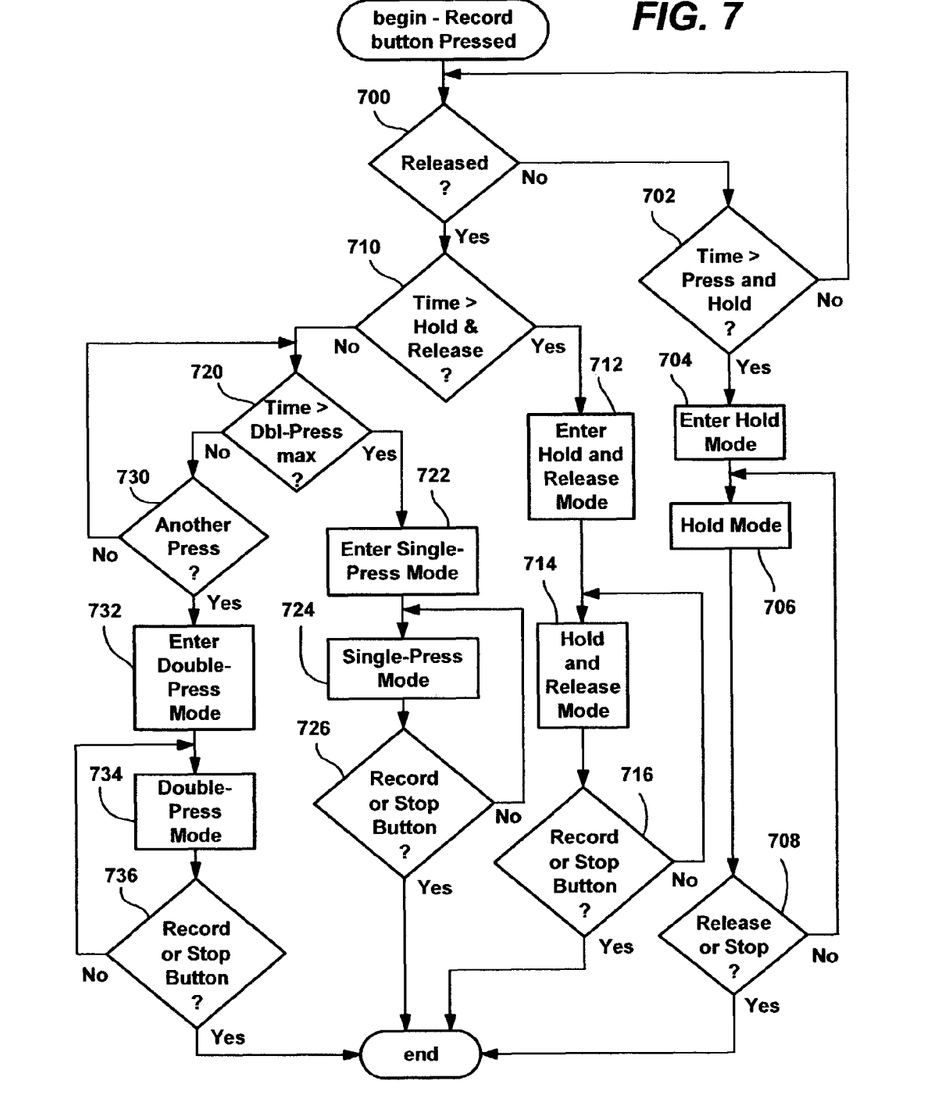
FIG. 7 is a flow diagram generally representing example logic of a mechanism that selects a record mode based on a record button actuation method, in accordance with an aspect of the present invention.

FIG. 7 shows an example process (e.g., corresponding to the record mode selection mechanism 620 of FIG. 6) for distinguishing among four actuation methods that each can be detected mapped to one of the four modes in the above example. Note that FIG. 7 is only example logic for purposes of explanation, and thus shows loops and the like when an actual selection mechanism would be event driven, at least in part.

The process shown in FIG. 7 starts when the record button is pressed. Although not shown, the LED indicator 602 may be controlled at this time to provide the user with some information, such as to flash yellow indicating that recording is about to begin. Steps 700 and 702 represent the waiting until either the button is released, or a press and hold time threshold is reached, indicating that the user is holding the button indefinitely. As is readily apparent, this press and hold time threshold time needs to be longer than a hold and release threshold time, and provide enough of a timing window so that a user does not inadvertently enter the "hold indefinitely" mode when intending to enter the "hold and release" mode, yet not so long as to make the user wait unnecessarily. As described below, these times and actuation method mappings may be user configurable to match a given user's needs, somewhat similar to configuring a mouse.

As represented at step 702, if the user has not released the record button by the press and hold threshold time, then the user is considered to have entered the "hold indefinitely" (or simply "hold") mode, as represented by step 704. Depending on what this mode is mapped to operation-wise, step 704 will perform the necessary initial operations, such as to control the indicator 602, and possibly to pass a message to the application program if the selected record mode involves the application. Steps 706 and 708 represent operating in the hold mode until the button is released or the stop button is pressed (or some other appropriate indication is given).

Returning to step 700, if the record button is released before the press and hold (hold indefinitely) threshold is reached, then step 700 instead branches to step 710 to process this released state. Step 710 represents whether the hold and release threshold was met, which should be a long enough hold duration to clearly distinguish the user's actions from a quick press and release (like a single-click or double-click) action. If the hold and release threshold was met, step 710 branches to step 712, to initially enter the hold and release mode, such as to control the indicator 602, and possibly to pass an initialization message to the application program as needed. Steps 716 and 718 represent operating in the hold and release mode until the record button is again pressed, or the stop button is pressed (or some other appropriate indication is given).

Returning to step 710, if the hold and release time was not met, then the button was quickly pressed (clicked), either as a single-press action or as part of double-press action in this example. Step 720 determines whether the time was too long to be considered part of a double-press action, in which event step 720 branches to step 722 to enter a single-press mode, performing any initialization operations, before continuing to steps 724 and 726 to operate in this mode until stopped in some manner.

If step 720 instead determines that the press-and-release action was fast enough so as to possibly be part of a double-press action, steps 720 and 730 represent waiting for the second press, or timing out if too much time expires and entering the above-described single press mode. If a second press is received within the double-press time window, step 730 branches to step 732 to enter the double-press mode, performing any initialization operations, before continuing to steps 734 and 736 to operate in this double-press mode until stopped in some manner.

Note that while recording, if no significant audio input has been received for a long time, a recording mode may time out, possibly after some warning (which may occur at least in part via the LED recording indicator 602), so as to not fill an annotation or the like with background noise if the user becomes distracted after entering such a mode. Instead of exiting the recording mode in such a situation, a suspension of the actual recording may be performed, thus operating like conventional voice-operated recording devices. In other words, the record button may be configured to work in conjunction with a voice-activated recording mode. Video motion sensing may be similarly employed.

As can be appreciated, the above actuation methods and resultant operating modes are only examples of how a user may want a system configured. Default values for threshold times, default mappings of the actuation methods to recording modes, and default colors and patterns for controlling the record indicator, such as determined by empirical testing, may be sufficient for most users. Other users however may want to change these values from the default values to match their own needs. Further, users may choose not to use a given mode or actuation method, and may customize modes and methods, e.g., a triple-press (click) of the record button may also turn the camera on.

In this manner, for example, the user settings or default settings may be set so that a single click sends audiovisual input to an application program. Then, when working with a document, a single press of the record button may insert an audio annotation of whatever is recorded thereafter (until stopped) into a document at an appropriate location, such as at the cursor location in a word processing document, a selected cell a spreadsheet, and so on. In another application context, when listening to a voicemail message recorded in the computer, a press of the record button may be all that is needed to allow the user to record an audio reply to that message, e.g., for later sending to the party that left the message.

In sum, use of the record button may provide any audiovisual input data to an application program for handling in that application program's current context. Likewise, command and control can be activated through the use of the record button rather than through trigger words or mouse/software control. This gives users an intuitive and efficient way to integrate audiovisual data into their programs and to control their computer systems.

As described above, the record light (e.g., LED) 602 may be controlled to notify the user of the current action, corresponding to the current recording mode. Colors and/or flash patterns may be varied to provide the information. For example, off may indicate not selected, steady red may indicate recording or passing straight audio, yellow when speech-to-text recognition is active, or green when command and control is active. One flash pattern may indicate active but noisy, while another flash pattern may indicate that no sufficient sounds have been detected and that the recording will soon stop automatically unless the user starts or resumes speaking. Another color or flash pattern such as orange can indicate that voice recording is suspended until voice activated.

Although the record button may be configured to handle all of a user's audiovisual input needs, the record button can work with in combination with software-based switching. For example, a user may prefer to change modes to an extent based on software commands rather than solely on various methods of actuation. For example, a user familiar with a single on-off switch may want all actuation methods to simply toggle between on or off with respect to providing audiovisual data to an application program. Note however that a user may still accomplish each of the recording/operating modes by software switching, e.g., recognized code words and icon clicks.

Figure 8:
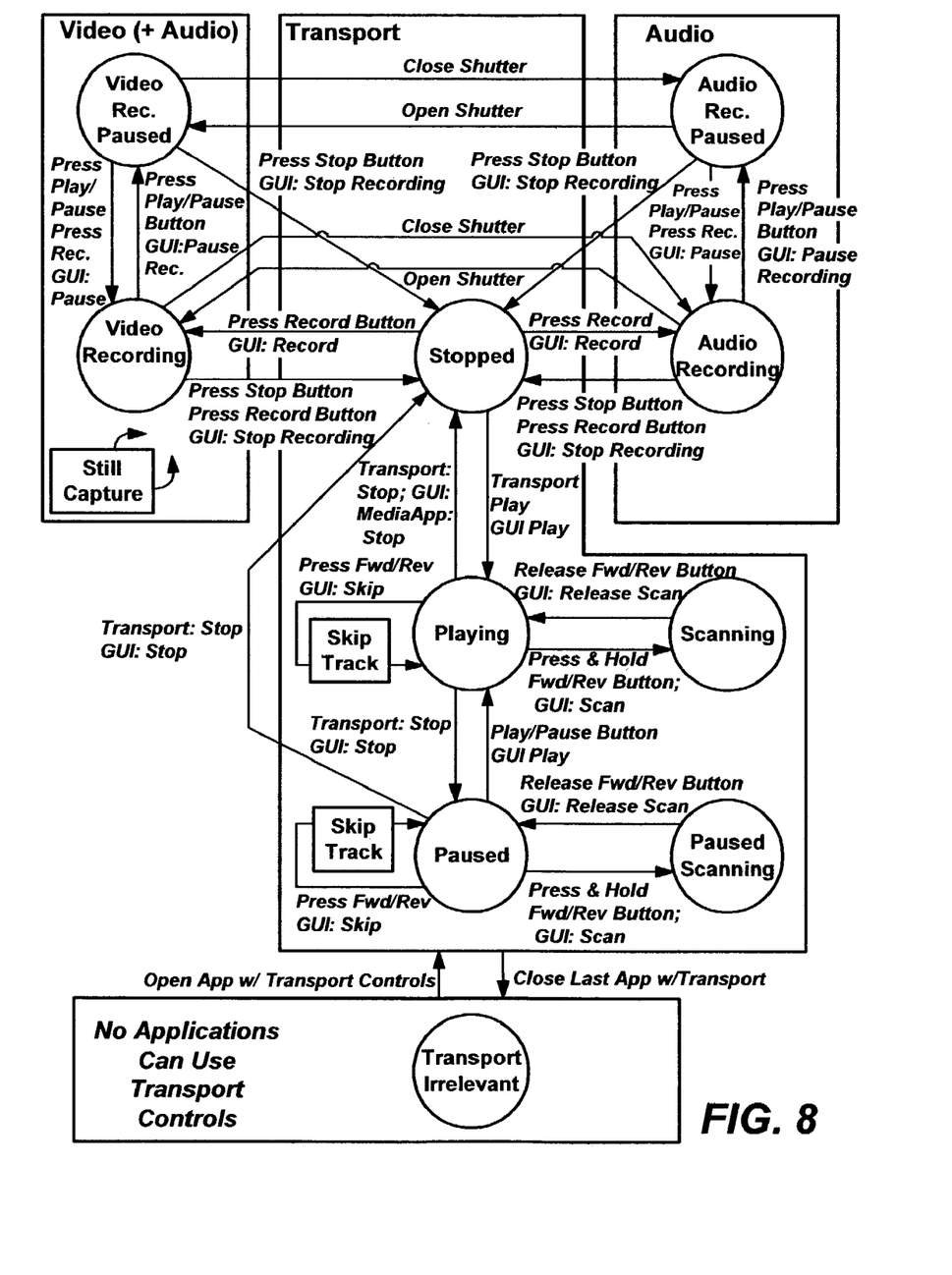
FIG. 8 is a state diagram generally representing states of operation and the transitions between those states based on use of the transport controls, including the record button, in accordance with an aspect of the present invention.

FIG. 8 is a state diagram representing use of the various transport controls and other mechanisms (e.g., a camera shutter and a graphical user interface) to accomplish tasks with respect to a top-level application, for example, including recording tasks. Note that in FIG. 8, audio is recorded whenever video is recorded, however it is possible to have a mode in which video only is recorded, e.g., with an automatic mute built into the mode. Further, note that the transport controls may be used for other purposes outside of application programs, such as to control the playback of recorded media.

As can be seen from the foregoing detailed description, there is provided a record button on a computer system that can significantly improve a user's computing experience with respect to entering audiovisual information. The record button may be set for various actuation methods corresponding to various operating modes, which may be user configurable to meet specific user data input needs. The method and system thus provide significant advantages and benefits needed in contemporary computing and communications.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computing system comprising:
   a processor;
   an audiovisual information input mechanism;
   a record button, the record button operably coupled to provide user-controlled recording state data to the operating system; and
   a component that receives the user-controlled recording state data from the record button and determines how to process audiovisual information received from the input mechanism based on the user-controlled recording state data and a current recording context, wherein different recording state data is generated in response to different corresponding methods of manual user interaction with the record button, the different corresponding method of manual user interaction including at least two of the following:
   a single press and release of the record button;
   a double press and release of the record button;
   a continuous depressing of the record button for a first predetermined threshold of time; and
   a continuous depressing of the record button for a second predetermined threshold of time which exceeds the first predetermined threshold of time.

2. The system of claim 1 wherein the component determines that the audiovisual information received from the input mechanism is to be provided to an application program.

3. The system of claim 1 wherein the component determines that the audiovisual information received from the input mechanism is to be provided to a speech recognition engine.

4. The system of claim 3 wherein the component receives text from the speech recognition engine.

5. The system of claim 4 wherein the component provides the text to an application program.

6. The system of claim 4 wherein the text is interpreted by the operating system as a command.

7. The system of claim 1 wherein the audiovisual information comprises audio data but not video data.

8. The system of claim 1 wherein the audiovisual information input mechanism comprises a microphone.

9. The system of claim 1 wherein the audiovisual information input mechanism comprises a camera.

10. The system of claim 1 wherein the record button is located on a computer keyboard.

11. The system of claim 1 wherein the record button is located on the audiovisual information input mechanism.

12. The system of claim 1 wherein the record button is located on a control panel.

13. The system of claim 1 wherein the record button is grouped with transport control buttons.

14. The system of claim 1 wherein the record button corresponds to a button on a computer mouse.

15. The system of claim 1 further comprising a record indicator that outputs information corresponding to a state of recording.

16. The system of claim 15 wherein the record indicator comprises an LED.

17. The system of claim 15 wherein the record indicator is incorporated into the record button.

18. The system of claim 15 wherein the record indicator is located proximate the record button.

19. The system of claim 1 wherein the component comprises a record mode selection mechanism that selects an operating mode based on a type of actuation of the record button with one of the different corresponding methods of manual interaction.

20. The system of claim 19 further comprising a record indicator that outputs information corresponding to the operating mode.

21. A method implemented by a computing system that includes a processor and one or more storage medium having stored computer-executable instructions which, when executed by the processor, implement the method, the method comprising:

detecting a type of actuation of a record button relative to at least one other type of actuation from a plurality of different actuation types of the record button, the plurality of different actuation types of the record button including at least two of the following:
- a single press and release of the record button;
- a double press-and-release of the record button;
- a continuous depressing of the record button for a first predetermined threshold of time; and
- a continuous depressing of the record button for a second predetermined threshold of time which exceeds the first predetermined threshold of time;

receiving recordable data; and determining how to process the recordable data based on the type of actuation detected, wherein a manner in which the recordable data is processed is dependent upon the detected type of actuation of the record button.

22. The method of 21 wherein the method further includes controlling a recording indicator by lighting the recording indicator a certain color to indicate that the recordable data is being provided to an application program.

23. The method of claim 22 wherein controlling the recording indicator comprises driving the indicator with a repetitive pattern.

24. The method of claim 21 further comprising detecting a camera state, and determining whether to provide a video component of the recordable data to the application program based on the camera state.

25. The method of claim 21 wherein detecting the type of actuation comprises detecting the single press and release of the record button.

26. The method of claim 21 wherein detecting type of actuation comprises detecting the double press-and-release of the record button.

27. The method of claim 21 wherein detecting the type of actuation comprises detecting the continuous depressing of the record button for the first predetermined threshold of time.

28. The method of claim 21 wherein detecting the type of actuation comprises detecting the continuous depressing of the record button for the first predetermined threshold of time.

29. The method of claim 21 wherein determining how to process the recordable data based on the type of actuation detected comprises mapping the type of actuation to an operating mode.

30. The method of claim 21 wherein receiving recordable data comprises receiving audio data but not video data.

31. The method of claim 21 further comprising controlling a record indicator.

32. The method of claim 21 wherein controlling the record indicator comprises lighting the indicator a certain color to indicate that the recordable data is being processed.

33. The method of claim 21 wherein controlling the record indicator comprises driving the indicator with a repetitive pattern.

34. The method of claim 21 wherein determining how to process the recordable data comprises determining that the recordable data is to be provided to an application program.

35. The method of claim 21 wherein determining how to process the recordable data comprises determining that the recordable data is to be provided to a speech recognition engine.

36. The method of claim 35 further comprising receiving text from the speech recognition engine.

37. The method of claim 36 further comprising providing the text to an application program for recording as text.

38. The method of claim 36 further comprising interpreting the text as a command.

39. A computer-readable storage medium storing computer-executable instructions which, when executed by a processor of a computing system, implement a method comprising:

detecting a type of actuation of a record button relative to at least one other type of actuation from a plurality of different actuation types of the record button, the plurality of different actuation types of the record button including at least two of the following:
- a single press and release of the record button;
- a double press and release of the record button;
- a continuous depressing of the record button for a first predetermined threshold of time; and
- a continuous depressing of the record button for a second predetermined threshold of time which exceeds the first predetermined threshold of time;

receiving recordable data; and determining how to process the recordable data based on the type of actuation detected, wherein a manner in which the recordable data is processed is dependent upon the detected type of actuation of the record button.

* * * * *